US012362887B2

(12) United States Patent
Bagheri et al.

(10) Patent No.: US 12,362,887 B2
(45) Date of Patent: Jul. 15, 2025

(54) APERIODIC CHANNEL STATE INFORMATION FOR ULTRA-RELIABLE LOW-LATENCY COMMUNICATION

(71) Applicant: Lenovo (Singapore) Pte. Ltd., New Tech Park (SG)

(72) Inventors: Hossein Bagheri, Urbana, IL (US); Hyejung Jung, Northbrook, IL (US); Vijay Nangia, Woodridge, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 386 days.

(21) Appl. No.: 17/797,718

(22) PCT Filed: Feb. 15, 2021

(86) PCT No.: PCT/IB2021/051265
§ 371 (c)(1),
(2) Date: Aug. 4, 2022

(87) PCT Pub. No.: WO2021/161286
PCT Pub. Date: Aug. 19, 2021

(65) Prior Publication Data
US 2023/0068109 A1    Mar. 2, 2023

Related U.S. Application Data

(60) Provisional application No. 62/976,329, filed on Feb. 13, 2020.

(51) Int. Cl.
*H04W 52/14* (2009.01)
*H04L 1/1812* (2023.01)
(Continued)

(52) U.S. Cl.
CPC .......... *H04L 5/0055* (2013.01); *H04L 1/1812* (2013.01); *H04W 52/146* (2013.01);
(Continued)

(58) Field of Classification Search
None
See application file for complete search history.

(56) References Cited

U.S. PATENT DOCUMENTS

2020/0367244 A1\*  11/2020  Yang ..................... H04L 5/0091
2023/0016768 A1\*  1/2023   Yang ..................... H04W 72/23

FOREIGN PATENT DOCUMENTS

| CN | 106688292 A | 5/2017 |
| CN | 109923924 A | 6/2019 |

(Continued)

OTHER PUBLICATIONS 202180013778.4 , "Foreign Office Action", CN Application No. 202180013778.4, Jul. 31, 2024, 16 pages.
(Continued)

*Primary Examiner* — Benjamin Lamont
(74) *Attorney, Agent, or Firm* — FIG. 1 Patents

(57) ABSTRACT

Methods and apparatus are provided, in which a downlink (DL) grant is received (902) triggering an aperiodic channel state information (ACSI) report and a physical downlink shared channel (PDSCH) transmission being scheduled. A first physical uplink control channel (PUCCH) resource for ACSI transmission and a second PUCCH resource for hybrid automatic repeat request (HARQ) acknowledgment (ACK) transmission corresponding to the scheduled PDSCH are determined (904). A first PUCCH transmission power for the ACSI transmission using the first PUCCH resource and a second transmission power for the HARQ ACK transmission using the second PUCCH resource are determined (906) based on downlink control information (DCI) of the DL grant.

20 Claims, 7 Drawing Sheets

(51) Int. Cl.
  *H04L 5/00* (2006.01)
  *H04W 52/16* (2009.01)
  *H04W 72/21* (2023.01)
  *H04W 72/23* (2023.01)

(52) U.S. Cl.
  CPC ........... *H04W 52/16* (2013.01); *H04W 72/21* (2023.01); *H04W 72/23* (2023.01)

(56) References Cited

FOREIGN PATENT DOCUMENTS

| | | |
|---|---|---|
| CN | 110741580 A | 1/2020 |
| EP | 3193550 A1 | 7/2017 |
| EP | 4104333 B1 | 12/2024 |
| WO | 2014208924 A1 | 12/2014 |
| WO | 2016093618 A1 | 6/2016 |
| WO | 2018227538 A1 | 12/2018 |
| WO | 2019160846 A1 | 8/2019 |

OTHER PUBLICATIONS

Ericsson, "On aperiodic and semi-persistent CSI reporting on PUCCH", 3GPP TSG RAN WG1 Meeting 90bis, R1-1718443, Prague, CZ, Oct. 2017, 3 pages.
PCT International Search Report for PCT/IB2021/051265, Lenovo (Singapore) Pte. Ltd., mailing date—May 3, 2021.
3GPP TS 38.213 V16.0.0 (Dec. 2019), 3rd Generation Partnership Project; Technical Specification Group Radio Access Network; NR; Physical layer procedures for control (Release 16).
3GPP TS 38.214 V16.0.0 (Dec. 2019), 3rd Generation Partnership Project; Technical Specification Group Radio Access Network; NR; Physical layer procedures for data (Release 16).
3GPP TS 38.321 V15.8.0 (Dec. 2019), 3rd Generation Partnership Project; Technical Specification Group Radio Access Network; NR; Medium Access Control (MAC) protocol specification (Release 15).
3GPP TS 38.331 V15.8.0 (Dec. 2019), 3rd Generation Partnership Project; Technical Specification Group Radio Access Network; NR; Radio Resource Control (RRC) protocol specification (Release 15).
"Notification to Grant Patent Right for Invention", Jan. 1, 2025, 3 pages.

\* cited by examiner

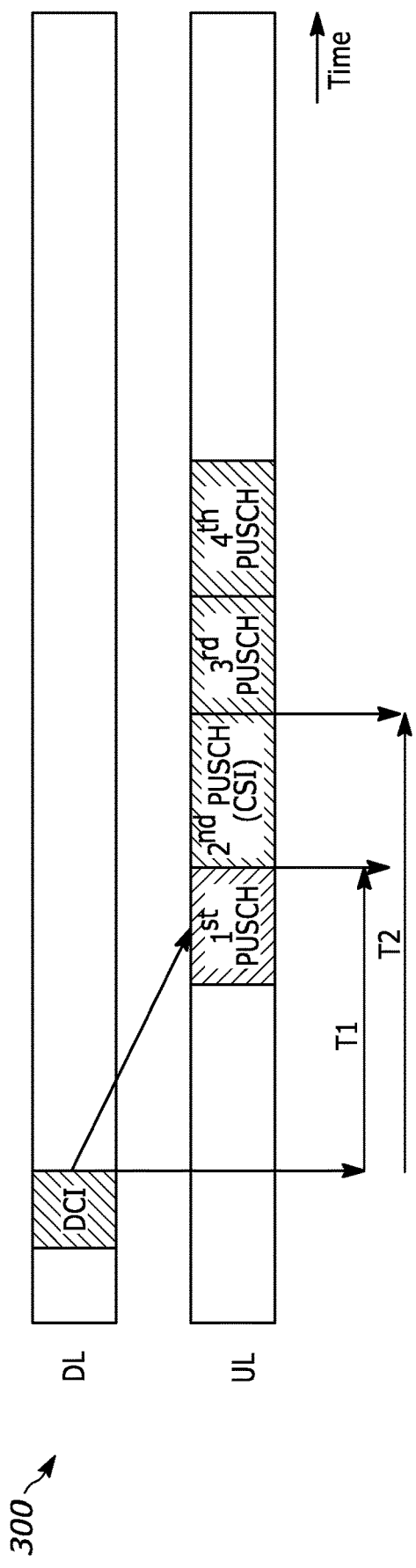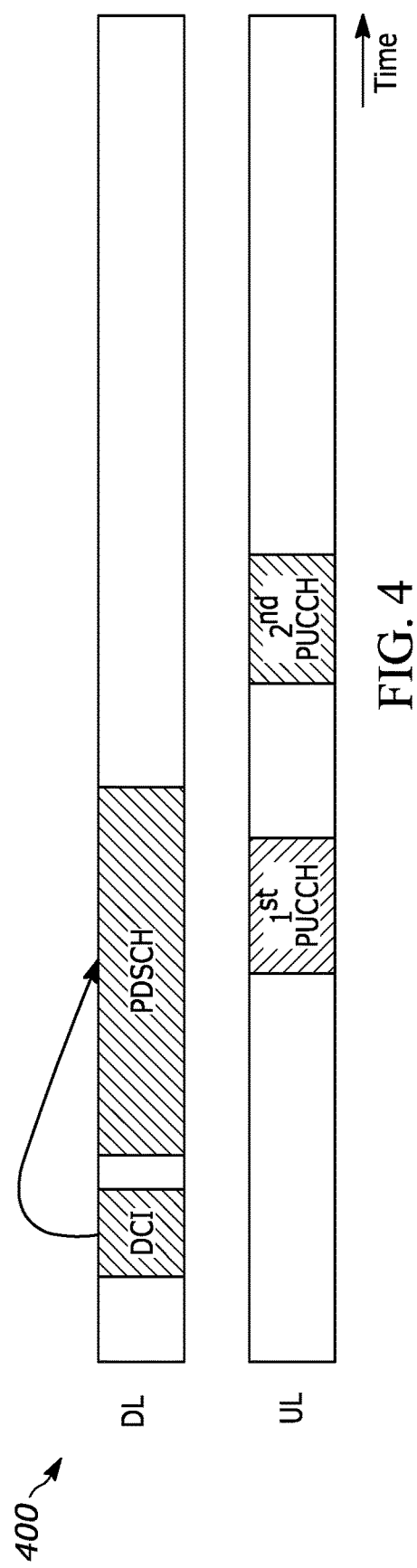
FIG. 3
FIG. 4

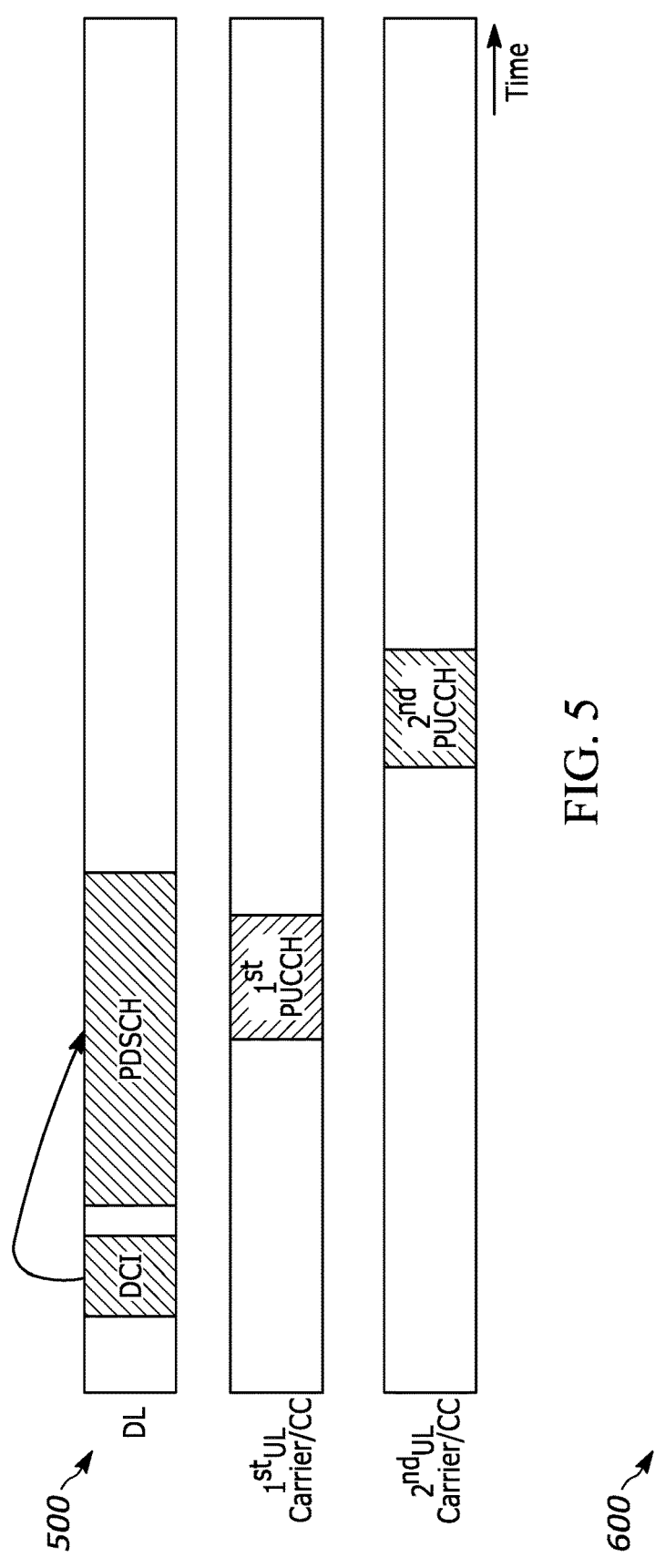
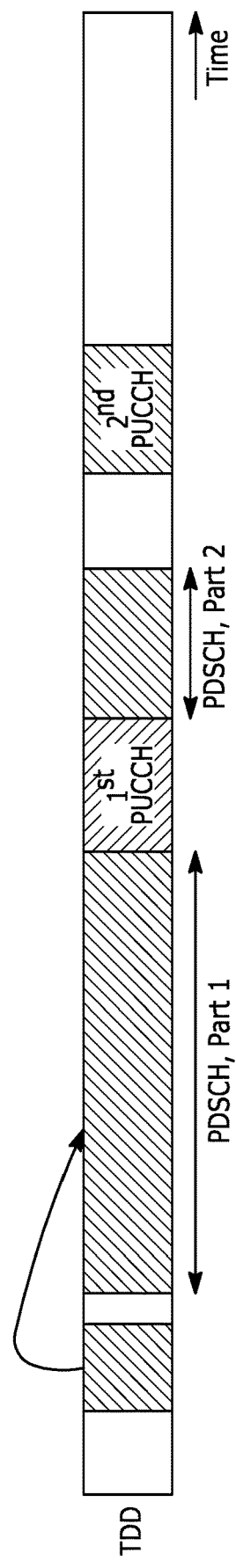
FIG. 5
FIG. 6

| TPC Command Field | Accumulated $\delta_{PUSCH,b,f,c}$ Or $\delta_{SRS,b,f,c}$ [dB] | Absolute $\delta_{PUSCH,b,f,c}$ Or $\delta_{SRS,b,f,c}$ [dB] |
|---|---|---|
| 0 | -1 | -4 |
| 1 | 0 | -1 |
| 2 | 1 | 1 |
| 3 | 3 | 4 |

| TPC Command Field | Accumulated $\delta_{PUCCH,b,f,c}$ [dB] |
|---|---|
| 0 | -1 |
| 1 | 0 |
| 2 | 1 |
| 3 | 3 |

APERIODIC CHANNEL STATE INFORMATION FOR ULTRA-RELIABLE LOW-LATENCY COMMUNICATION

FIELD OF THE INVENTION

The present disclosure is directed to triggering and scheduling of an aperiodic channel state information report, including instances involving ultra-reliable low-latency communications.

BACKGROUND OF THE INVENTION

Presently, user equipment, such as wireless communication devices, communicate with other communication devices using wireless signals, such as within a network environment that can include one or more cells within which various communication connections with the network and other devices operating within the network can be supported. Network environments often involve one or more sets of standards, which each define various aspects of any communication connection being made when using the corresponding standard within the network environment. Examples of developing and/or existing standards include new radio access technology (NR), Evolved Universal Terrestrial Radio Access (E-UTRA), Long Term Evolution (LTE), Universal Mobile Telecommunications Service (UMTS), Global System for Mobile Communication (GSM), and/or Enhanced Data GSM Environment (EDGE).

In order to better support applications that can have more time sensitive communication, where both reliability and latency are an issue, there has been an increasing focus on a type of communication identified as ultra-reliable low-latency communications (URLLC). While traditionally, data reliability and latency could be traded off, so as to better support one or the other. Increasingly, applications are desiring that performance relative to both factors be simultaneously enhanced.

Correspondingly, some of the more traditional ways of handling some of the control signaling needs to be rethought. For example, channel state information (CSI) corresponds to known or determined channel properties of a communication link from the perspective of the receiver. The information can be used by the anticipated transmitter of information to adjust the setting and parameters that are to be used in communicating information to a recipient. Over time channel state information can change, so refreshing the information can be beneficial for enhancing the reliability of subsequent communications. Consequently, enhancing the timing, which can include the latency and the frequency with which the CSI can be updated can be beneficial, which in turn allows a transmitter to better adapt to the current channel conditions, such as in instances involving URLLC where the reliability of the related messaging being communicated can be important. An aperiodic CSI can be used to request a CSI report at a time that might not have been otherwise scheduled, and/or at a time that is separate from other communications, such as during an anticipated or planned hybrid automatic repeat request (HARQ) acknowledgement (ACK).

The present inventors have recognized that by triggering and scheduling an aperiodic channel state information report in response to receiving a downlink grant, it may be possible and beneficial to determine multiple physical uplink control channel transmissions for alternatively transmitting the ACSI report and the HARQ ACK, which in turn may allow for the ACSI report to be transmitted sooner, and which in turn could allow a separate transmission power to be determined for each of these events, which in turn may allow for the reliability of the messaging in support of an URLLC mode of operation to be enhanced.

SUMMARY

The present application provides a method in a user equipment. The method includes receiving a downlink (DL) grant triggering an aperiodic channel state information (ACSI) report and scheduling a physical downlink shared channel (PDSCH) transmission. A first physical uplink control channel (PUCCH) resource for ACSI transmission and a second PUCCH resource for hybrid automatic repeat request (HARQ) acknowledgment (ACK) transmission corresponding to the scheduled PDSCH are determined. A first PUCCH transmission power for the ACSI transmission using the first PUCCH resource and a second transmission power for the HARQ ACK transmission using the second PUCCH resource are determined based on downlink control information (DCI) of the DL grant.

According to another possible embodiment, a user equipment is provided. The user equipment includes a transceiver that receives a downlink (DL) grant triggering an aperiodic channel state information (ACSI) report and scheduling a physical downlink shared channel (PDSCH) transmission. The user equipment further includes a controller that determines a first physical uplink control channel (PUCCH) resource for ACSI transmission and a second PUCCH resource for hybrid automatic repeat request (HARQ) acknowledgment (ACK) transmission corresponding to the scheduled PDSCH. A first PUCCH transmission power for the ACSI transmission is determined by the controller using the first PUCCH resource and a second transmission power for the HARQ ACK transmission is determined by the controller using the second PUCCH resource based on downlink control information (DCI) of the DL grant.

According to a further possible embodiment, a method in a network entity is provided. The method includes transmitting a downlink (DL) grant to a particular user equipment triggering an aperiodic channel state information (ACSI) report and scheduling a physical downlink shared channel (PDSCH) transmission. An ACSI transmission via a determined first physical uplink control channel (PUCCH) resource and a hybrid automatic repeat request (HARQ) acknowledgment (ACK) transmission via a determined second PUCCH resource, which each correspond to the scheduled PDSCH are then received, where a first PUCCH transmission power for the ACSI transmission was determined using the first PUCCH resource and a second transmission power for the HARQ ACK transmission was determined using the second PUCCH resource based on downlink control information (DCI) of the DL grant.

According to a still further possible embodiment, a network entity is provided. The network entity includes a controller, and a transceiver that transmits a downlink (DL) grant to a particular user equipment triggering an aperiodic channel state information (ACSI) report and scheduling a physical downlink shared channel (PDSCH) transmission. The transceiver further receives an ACSI transmission via a determined first physical uplink control channel (PUCCH) resource and a hybrid automatic repeat request (HARQ) acknowledgment (ACK) transmission via a determined second PUCCH resource, which each correspond to the scheduled PDSCH, where a first PUCCH transmission power for the ACSI transmission was determined using the first PUCCH resource and a second transmission power for the HARQ ACK transmission was determined using the second PUCCH resource based on downlink control information (DCI) of the DL grant.

These and other features, and advantages of the present application are evident from the following description of one or more preferred embodiments, with reference to the accompanying drawings.

BRIEF DESCRIPTION OF THE DRAWINGS

FIG. 3 is a timing diagram, which illustrates an exemplary scheduling of multiple PUSCH transmissions, as well as the scheduling of a triggered ACSI;

FIG. 4 is a timing diagram, which illustrates an exemplary scheduling of an ACSI report and a HARQ ACK transmission;

FIG. 5 is a timing diagram, which illustrates a further exemplary scheduling of an ACSI report and a HARQ ACK transmission via multiple uplink carriers;

FIG. 6 is a timing diagram, which illustrates a still further exemplary scheduling of an ACSI report and a HARQ ACK transmission;

FIG. 7 is a table for the mapping of a transmit power command (TPC) Field in exemplary DCI formats;

FIG. 8 is a table for mapping of a TPC field in further exemplary DCI formats;

DETAILED DESCRIPTION OF THE PREFERRED EMBODIMENT(S)

Figure 1:
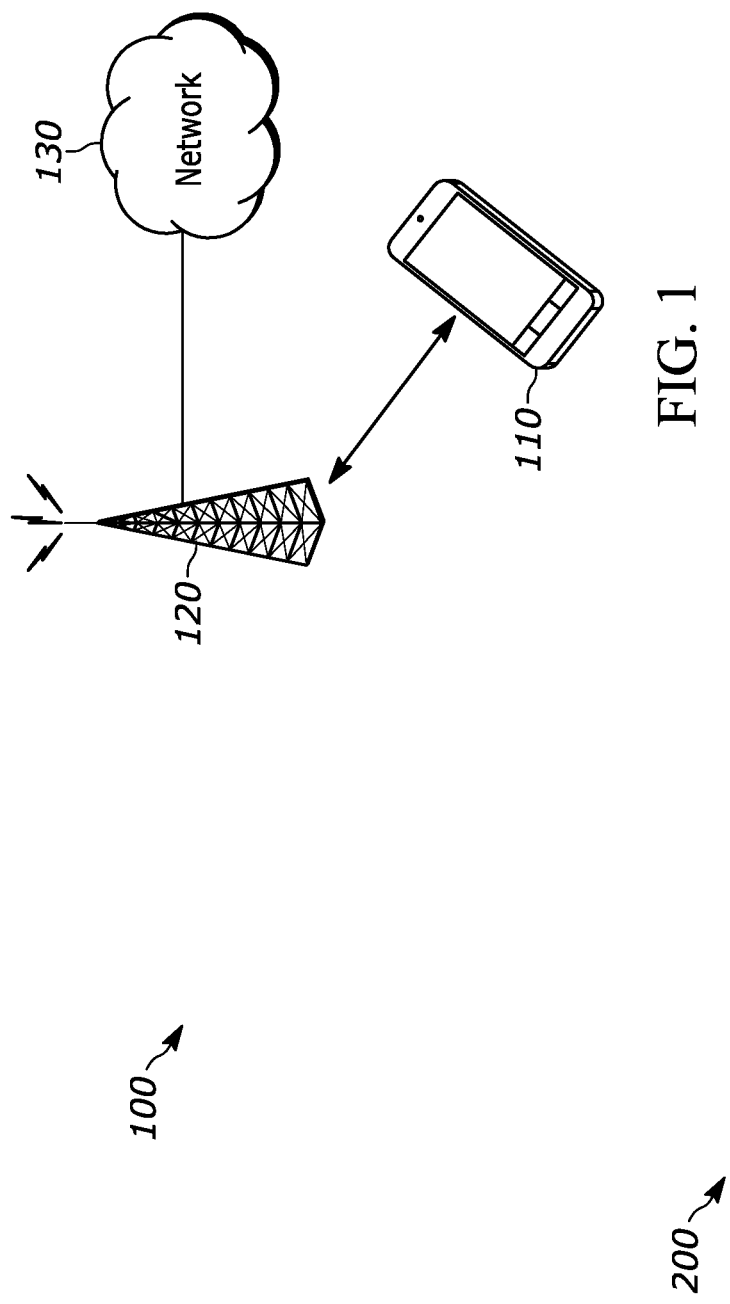
FIG. 1 is a block diagram of an exemplary network environment in which the present invention is adapted to operate.

While the present disclosure is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Embodiments provide for various methods and apparatus including mechanisms to enable low latency aperiodic channel state information. The mechanisms can involve aperiodic channel state information transmitted on a physical uplink control channel.

FIG. 1 is an exemplary block diagram of a system 100 according to a possible embodiment. The system 100 can include a wireless communication device 110, such as User Equipment (UE), a base station 120, such as an enhanced NodeB (eNB) or next generation NodeB (gNB), and a network 130. The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 5th generation (5G) network, a 3rd Generation Partnership Project (3GPP)-based network, a satellite communications network, a high altitude platform network, the Internet, and/or other communications networks.

Aperiodic CSI can be important for URLLC operation to provide timely feedback to adjust transmission parameters. As of now, ACSI can be triggered only by UL grant and would be transmitted on the physical uplink shared channel (PUSCH) scheduled by uplink (UL) grant.

It has been proposed to use DL grant to trigger CSI (to be transmitted on a PUCCH) to save control overhead in DL heavy operation (e.g., in case no PUSCH is to be scheduled).

If an UL grant schedules a PUSCH with repetitions, either via dynamic PUSCH repetition indication via the DCI of the UL grant or via slot aggregation (fixed/configured number of repetitions), and/or if the UL grant triggers an ACSI report for URLLC operation, such as if the DCI/radio resource control (RRC) configuration indicates a high priority CSI report, such as by having a field in the DCI triggering the CSI report or in RRC configuration of the CSI report, the CSI report may need to be sent in a short time, and carrying on the PUSCH with multiple repetition may not satisfy the time the CSI report needs to be sent.

In the case of unlicensed operation, wherein a DCI can schedule multiple transport blocks (TBs) using different PUSCHs (possibly in different overlapping/non overlapping time spans), the CSI is sent on a second PUSCH/penultimate scheduled PUSCH. However, such transmission may not satisfy the timeline requirements of CSI for URLLC operation.

The present disclosure provides mechanisms to determine:

Transmission power of a first and a second PUCCH transmissions corresponding to HARQ ACK of scheduled PDSCH, and triggered ACSI by a DL grant, PUCCH resource when an UL grant is used for ACSI transmission, PUSCH resource when an UL grant is used for ACSI transmission, PUCCH format to carry ACSI, and Priority of triggered CSI report.

Aperiodic CSI

Channel state information (CSI) is a feedback that a device can send to the network, which could help the network with selecting communication (such as scheduling) parameters for the device. Aperiodic CSI (A-CSI/ACSI) is a feedback provided by the device in response to a triggering event. A-CSI can be triggered by a DCI (control signal) sent by the network.

The procedures for aperiodic CSI reporting are described in details in TS 38.213, 38.214, 38.321, and 38.331.

CSI may consist one or more of (a) Channel Quality Indicator (CQI), (b) precoding matrix indicator (PMI), (c) CSI-reference signal (RS) resource indicator (CRI), (d) synchronization signals (SS)/physical broadcast channel (PBCH) Block Resource indicator (SSBRI), (e) layer indicator (LI), (f) rank indicator (RI), (8) L1-RSRP or (9) L1-SINR.

A UE can be configured by higher layers with N≥1 CSI report configurations (CSIReportConfig Reporting Settings), M≥1 CSI resource configurations (CSI-ResourceConfig Resource Settings), and at least one list of A-CSI trigger states (such as CSI-AperiodicTriggerStateList). Each configured trigger state (such as using the higher layer parameter CSI-AperiodicTriggerState) is associated with one or multiple CSI report configurations (CSI-ReportConfig) where each CSI-ReportConfig is linked to periodic, or semipersistent, or aperiodic resource setting(s).

Once a CSI report is triggered e.g., via a DCI,
An aperiodic resource offset is determined based on the resource offset configured for the resource set associated with the triggered CSI report (e.g., aperiodicTriggeringOffset for NZP-CSI-RS-ResourceSet [38.331])·
A timing offset is determined based on the DCI selecting one value from a set of configured offset values for the triggered CSI report configuration (e.g., reportSlotOffsetList from CSI-ReportConfig)

The UE, based on the triggered CSI report configuration(s) generates a CSI report, and sends it in a PUSCH (UL shared channel, such as the PUSCH scheduled by the DCI triggering the CSI report(s)). A parameter in the CSI report configuration indicates the parameters the UE is supposed to include in the CSI report (e.g., reportQuantity parameter can indicate CRI, rank indicators (RI), and channel quality indicators (CQI) should be reported).

Each CSI report setting/configuration can be associated with a single bandwidth part (BWP) for channel measurement, and contains the parameter(s) for one CSI reporting band.

Currently, ACSI can be triggered via an UL grant scheduling a PUSCH, with or without an UL-shared channel (SCH) (e.g., uplink data/UL transport block) in the PUSCH. According to TS 38.214:

When the UE is scheduled to transmit a transport block and no CSI report, or the UE is scheduled to transmit a transport block and a CSI report(s) on PUSCH by a DCI, the Time domain resource assignment field value m of the DCI provides a row index m+1 to an allocated table. The determination of the used resource allocation table is defined in Clause 6.1.2.1.1 of TS 38.214. The indexed row defines the slot offset K2, the start and length indicator SLIV, or directly the start symbol S and the allocation length L, the PUSCH mapping type, and the number of repetitions (if numberof-repetitions is present in the resource allocation table) to be applied in the PUSCH transmission.

When the UE is scheduled to transmit a PUSCH with no transport block and with a CSI report(s) by a CSI request field on a DCI, the Time domain resource assignment field value m of the DCI provides a row index m+1 to an allocated table which is defined by the higher layer configured puschTimeDomainAllocationList in pusch-Config. The indexed row defines the start and length indicator SLIV, and the PUSCH mapping type to be applied in the PUSCH transmission and the K2 value is determined as $$K_2 = \max_j Y_j(m+1)$$

where $Y_{i,j}=0, \ldots, N_{Rep}-1$ are the corresponding list entries of the higher layer parameter
[reportSlotOffsetList-r16-ForDCIFormat0_2, if PUSCH is scheduled by DCI format 0_2;

reportSlotOffsetList-r16-ForDCIFormat0_1, if PUSCH is scheduled by DCI format 0_1 and reportSlotOffsetList-r16-ForDCIFormat0_1 is configured];
reportSlotOffsetList, [otherwise;] in CSI-ReportConfig for the $N_{Rep}$ triggered CSI Reporting Settings and $Y_j$ (m+1) is the (m+1)th entry of $Y_j$.

The UE determines the Offset X between the slot containing the DCI that triggers a set of aperiodic NZP CSI-RS resources and the slot in which the CSI-RS resource set is transmitted based on the aperiodicTriggeringOffset associated with the triggered ACSI report.

Throughout the present disclosure, A-CSI is generally associated with low latency operation unless specifically distinguished (e.g., low-latency CSI for CSI with short CSI timeline (such as CSI computation and transmission time) and non-low-latency CSI with larger CSI timeline compared to low-latency CSI timeline).

CSI Reporting Using PUCCH Scheduled by an UL Grant

Embodiment 1 (PUCCH Indication on UL Grant)

In an embodiment, the UE receives an UL grant triggering an aperiodic CSI report and scheduling a PUSCH transmission, the UL grant indicates at least one of the following:
a) Whether to transmit the CSI report on the PUSCH or on a PUCCH
b) PUCCH resource wherein the CSI report is to be sent
  a. In an example, a PUCCH resource index is indicated in the UL grant and a PUCCH timing is also indicated (how many symbols/subslots (such as PUCCH subslots)/slots the PUCCH happens after the last symbol of the UL grant)
    i. There could be some processing procedure time (processing time requirements similar to Tproc1 or Tproc2 or Tproc, CSI as defined in TS 38.214): e.g., the first symbol of the PUCCH should not occur before a certain time after the end of the reception of the last symbol of the PDCCH carrying the DCI scheduling the PUSCH (or a PDSCH, if a DL assignment triggers a CSI report and schedules the PDSCH).

Figure 2:
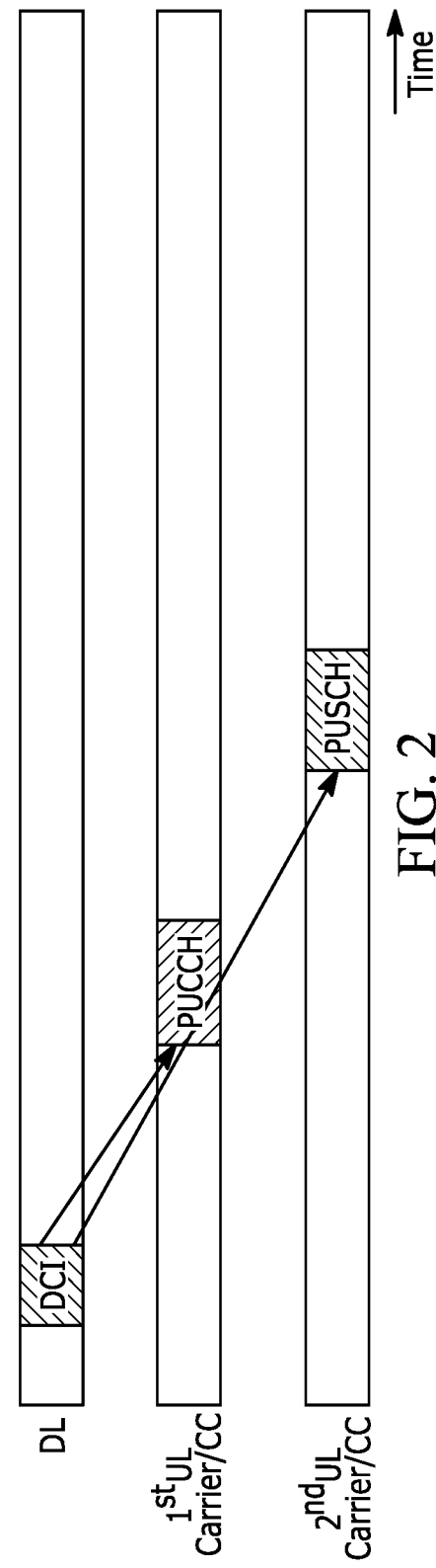
FIG. 2 is a timing diagram, which illustrates an exemplary triggering of an ACSI report, in accordance with at least one embodiment.

In a related embodiment, the UE receives an UL grant triggering an aperiodic CSI report and scheduling a PUSCH transmission; the UE determines to use a PUCCH resource instead of the PUSCH in case of occurrences of at least one of the following.
the PUSCH length (number of PUCCH symbols including those of PUSCH repetitions; possibly also including DL/non-UL symbols) is longer than a determined period (such as the time CSI needs to be sent after triggering the CSI report which can be a configured value e.g., in the CSI report configuration or can be related/derived from a processing procedure timeline).
The triggered CSI quantity/type to be reported is a particular quantity/type (e.g. CQI only report)·
The triggered CSI report size is smaller than certain number of bits.
The PUCCH resource occurs/ends earlier than the PUSCH
  In an example, illustrated in FIG. 2, the PUCCH is sent/scheduled on a first component carrier, and the PUSCH is sent/scheduled on a second component carrier.
  FIG. 2 illustrates a timing diagram 200. In FIG. 2 an UL DCI schedules a PUCCH transmission for a triggered ACSI report and a PUSCH transmission for UL data transmission and/or triggered/semi persistent CSI reports.

The number of REs required for CSI report is larger than the number of data REs that can be communicated on the PUSCH In a related embodiment, the CSI report triggered by an UL grant can be sent via a PUCCH if configured by the network; otherwise, the CSI report triggered by the UL grant should follow rules of previous 3GPP releases (e.g., ACSI to be sent on the PUSCH scheduled by the UL grant).

In a related embodiment, for the PUCCH scheduled by the UL grant, the PUCCH transmission time is determined based on a DCI field in the UL grant. In an example, the field chooses one value from a set of configured values/offsets. In an example, the set of values configured for PDSCH-to-HARQ_feedback timing can be used as the values for the set of configured values/offsets for CSI PUCCH timing (e.g., PDSCH-to-HARQ_feedback timing values can be directly used or a function of those PDSCH-to-HARQ_feedback timing values can be used). In one example, the PUCCH transmission time is determined based on the largest indicated offset value from a set of values (e.g., reportSlotOffsetList) configured for each CSI report corresponding to the triggered CSI state. The indication indicates the set element index and may be based on a DCI field (e.g., TDRA field value). The reportSlotOffsetList may be different for UL grant triggering CSI on PUCCH and UL grant triggering CSI on PUSCH.

In one example, the PUCCH transmission time is determined at least based on the PUSCH transmission time (e.g. starting PUSCH symbol) minus an offset value (e.g., the PUCCH starts 'X' symbols before start of the PUSCH transmission). In one example 'X' is a positive or non-negative number, and in another example, 'X' is a negative number.

In one example, the triggered CSI state comprises multiple CSI report configurations, and the PUCCH transmission time for carrying the triggered CSI report is determined based on the largest offset value from a set of offset values, wherein an offset value of the set of offset values corresponds to the configured offset list (e.g., reportSlotOffsetList as described in TS 38.331) for the CSI report configuration of the multiple CSI report configurations, and the DCI indicates/determines the offset value of the configured offset list associated with each CSI report configuration. In one example, the UE is configured with a maximum number of repetitions for CSI on PUSCH with repetitions or slot aggregation. In another example, the UE is indicated based on a DCI field in the UL grant the number of repetitions for CSI on PUSCH with repetitions which can be less than the number of PUSCH repetitions.

In one example, the number of resources (e.g., REs) for CSI on PUSCH with repetitions may be based on the total number of repetitions for PUSCH and the number of repetitions for CSI. In one example, an offset term may be added to the beta-offset values (e.g., adjustment to the beta-offset values) for CSI (wherein beta-offset values can be beta-offsetACK, betaOffsetCSI-Part1, betaOffsetCSI-Part2 e.g., as defined in TS 38.213/TS 38.331) where the offset term may be based on the total number of repetitions for PUSCH and the number of repetitions for CSI. This may occur when the CSI report is on at least one but not all repetition (e.g., indicated by UL grant) of a PUSCH (e.g., UL grant schedules a PUSCH with repetitions).

In one embodiment, when the CSI report is on at least one repetition but not all repetitions (e.g., indicated by UL grant) of a PUSCH (e.g., UL grant schedules a PUSCH with repetitions), the CSI punctures at least a portion of the data REs (e.g., excluding the DMRS REs) on the at least one repetition. In one example, puncturing means channel coded symbols of the encoded PUSCH TB are mapped to the at least the portion of the data REs but skipped from transmission and instead the CSI REs are transmitted on the at least the portion of the data REs.

CSI Reporting Using Pusch Scheduled by an Ul Grant

From 38.214:

When a DCI format 0_1 schedules two PUSCH allocations, the aperiodic CSI report is carried on the second scheduled PUSCH. When a DCI format 0_1 schedules more than two PUSCH allocations, the aperiodic CSI report is carried on the penultimate scheduled PUSCH.

Embodiment 2 (PUSCH Index Indication to Carry ACSI in Multi PUSCH Assignment in e.g., NRU)

In an embodiment, When a DCI format schedules two or more PUSCH allocations (e.g., corresponding to different transport blocks or corresponding to the same transport block), the aperiodic CSI report is carried on an indicated scheduled PUSCH (the DCI indicates which of those scheduled PUSCHs should carry the ACSI report).

A motivation for this embodiment could be the case of unlicensed operation, wherein a DCI can schedule multiple transport blocks (TBs) using different PUSCHs (possibly in different overlapping/non overlapping time spans). Depending on when CSI is needed, the network can indicate which PUSCH(s) to carry the CSI report.

In one example, the CSI report may be carried on the earliest PUSCH that meets the processing timeline requirements, e.g., the first symbol of the PUSCH should not occur before a certain time offset after the end of the reception of the last symbol of the PDCCH carrying the DCI scheduling the PUSCH (and triggering the ACSI report). In one example, the time offset for determining the PUSCH carrying CSI transmission is based on the largest indicated offset value from a set of values (e.g., reportSlotOffsetList) configured for each CSI report corresponding to the triggered CSI state. The indication indicates the set element index and may be based on a DCI field (e.g., TDRA field value).

FIG. 3 shows an example of a timing diagram 300, which includes determining a PUSCH resource/transmission occasion/instance for CSI transmission amongst multiple scheduled PUSCHs by the DCI. In another example, the multiple PUSCHs are associated with a configured grant(s) and the DCI triggers the ACSI report.

More specifically, in FIG. 3 DCI schedules 4 PUSCHs (carrying different TBs); the DCI also triggers an ACSI report. In the illustrated example, the ACSI report is transmitted on the $2^{nd}$ PUSCH. CSI transmission time line requirement: CSI report transmission cannot be started earlier than T1 time (e.g., symbols/subslots/slots) after the end of the PDCCH carrying the DCI and cannot be finished later than T2 time (e.g., symbols/subslots/slots) after the end of the PDCCH carrying the DCI.

CSI Reporting Using Pucch Scheduled by a Dl Grant

At least one motivation for enabling ACSI on a PUCCH scheduled by a DL assignment/grant can be to avoid sending an UL grant triggering ACSI when there is no UL data (TB) to be scheduled.

In 38.213, the PUCCH transmit power is determined according to the following formula wherein different elements of the formula are described in TS 38.213:

$$P_{PUCCH,b,f,c}(i,q_u,q_d, l) =$$

$$\min \begin{cases} P_{CMAX,f,c}(i), \\ P_{O\_PUCCH,b,f,c}(q_n) + 10\log_{10}\left(2^\mu \cdot M_{RB,b,f,c}^{PUCCH}(i)\right) + PL_{b,f,c}(q_d) + \text{[dbm]} \\ \Delta_{F\_PUCCH}(F) + \Delta_{TB,b,f,c}(i) + g_{b,f,c}(i,l) \end{cases}$$

Embodiment 3 (CSI PUCCH Power Control)

In an embodiment, the UE receives a DL grant/assignment triggering an aperiodic CSI report and scheduling a PDSCH transmission. The UE determines a first PUCCH resource for ACSI transmission and a second PUCCH resource for HARQ-ACK transmission corresponding to the scheduled PDSCH.

The UE determines a first PUCCH transmission power for the first PUCCH transmission and a second transmission power for the second PUCCH transmission based on the DCI of the DL grant/assignment.

Some examples are depicted in FIGS. 4-6.

FIG. 4 illustrates a timing diagram 400. In FIG. 4, 1st PUCCH (for ACSI) and 2nd PUCCH (for HARQ ACK) can have different transmission powers.

FIG. 5 illustrates a further timing diagram 500. In FIG. 5, 1st PUCCH (for ACSI) and 2nd PUCCH (for HARQ ACK) can have different transmission powers. The DCI carries at least TPC command.

FIG. 6 illustrates a still further timing diagram 600. In FIG. 6, 1st PUCCH (for ACSI) and 2nd PUCCH (for HARQ ACK) can have different transmission powers; DCI schedules PDSCH, and some UL resources occur somewhere in the middle of the group of DL symbols for the PDSCH.

In a related embodiment, the UE determines the first and the second PUCCH transmission powers based on a single field in the DCI (e.g., 2-bit TPC command for scheduled PUCCH as used in DCI format 1-1) e.g., the same TPC command is applied to both PUCCHs (1st PUCCH and 2nd PUCCH).

In a related embodiment, the PUCCH power control adjustment state is the same for both PUCCHs (1st PUCCH and 2nd PUCCH).

In a related embodiment, the transmit power of the first PUCCH is derived based on the TPC command and an offset to at least one parameter determining the transmit power of the second PUCCH: e.g., $\Delta_{F_{PUCCH}}(F)$ for the first PUCCH is derived as follows: $\Delta_{F_{PUCCH}}(F)$ for the second PUCCH plus an offset 'D' when both PUCCHs use the same PUCCH format. In an example, 'D' is configured by higher layers. In at least one example, 'D' is configured by higher layers for each PUCCH format.

In a related embodiment, the transmit power of the first PUCCH is derived based on an offset term added to the Po_PUCCH. The offset term may be configured by higher layers. Po_PUCCH without any offset is used for the second PUCCH.

In an embodiment, the UE receives an UL grant/assignment triggering an aperiodic CSI report and scheduling a PUSCH transmission (e.g., the PUSCH includes UL TB and/or non-low latency CSI (a CSI that is due later than the low-latency CSI); both low-latency and non-low-latency CSIs are triggered by the UL grant). The UE determines a PUCCH resource for ACSI transmission.

The UE determines the PUCCH transmission power for the PUCCH transmission based on the DCI of the UL grant/assignment.

In one example, a first field in the DCI indicates the TPC command for the PUSCH, and a second field in the DCI indicates the TPC command for the PUCCH.

In an example, a single TPC field indicates TPC commands for the first and for the second PUCCHs. For instance, a first number of most significant bits of the field is for the second PUCCH TPC and the rest of the bits (a second number of bits) are for the first PUCCH TPC. In an example, one or both of the first number of bits and the second number of bits are configured.

In a related embodiment, the UE determines the PUSCH transmission power and the PUCCH transmission power based on a single field in the DCI (e.g., 2-bit TPC command for scheduled PUSCH as used in e.g., DCI format 2-0) e.g., the same TPC command is applied to both PUSCH and PUCCH or alternatively, the TPC command applicable to the PUCCH is derived from the TPC command signaled in the DCI: e.g., the transmission power update due to the TPC command is derived based on the PUSCH and PUCCH resource allocations e.g., number of RBs.

In an example, if the UE is not configured for TPC accumulation for PUSCH transmission (TPC command is absolute not accumulated e.g., table 7.1.1-1 in TS 38.213), which is reproduced herein as FIG. 7, the TPC command applicable to PUCCH is derived from the TPC command for PUSCH by using the same TPC command field index but mapping it to accumulated TPC command value in dB. E.g., if the TPC command field is '0' (first entry of the table 7.1.1-1 in TS 38.213 the TPC command for PUCCH would be −1 dB whereas for PUSCH would be −4 dB).

More specifically, FIG. 7 corresponding to table 7.1.1-1 in TS 38.213 illustrates a table 700, which includes a mapping of TPC Command Field in a DCI format scheduling a PUSCH transmission, or in DCI format 2_2 with CRC scrambled by TPC-PUSCH-RNTI, or in DCI format 2_3 to absolute and accumulated $\delta_{PUSCH,b,f,c}$ values or $\delta_{SRS,b,f,c}$ values. Alternatively, FIG. 8 corresponding to table 7.2.1-1 in TS 38.213 illustrates a table 800, which includes a mapping of TPC Command Field in DCI format or DCI format 1_1 or DCI format 2_2 with CRC scrambled by TPC-PUCCH-RNTI to accumulated $\delta_{PUCCH,b,f,c}$ values.

In a related embodiment, the PUCCH power control adjustment state is the same for PUCCH and PUSCH.

CSI Multiplexing/Prioritization Rules Between Pucch and Pusch/Pucch

In an embodiment, when a DL grant triggers ACSI and schedules a PDSCH transmission, the UE multiplexes the HARQ-ACK corresponding to the PDSCH and the CSI report corresponding to the triggered ACSI onto a PUCCH resource indicated by the DL grant when Condition 1: the first symbol of the PUCCH resource is not before a certain time (e.g., $T_{proc,1}^{max}$ defined in 3GPP TS 38.213) after a last symbol of the PDSCH, and Condition 2: the last symbol of the PUCCH resource is not after a certain time (e.g., CSI timeline/latency requirement).

In a related embodiment, if the above condition is not satisfied, the UE determines a second PUCCH resource, and transmits the HARQ-ACK corresponding to the PDSCH on the first PUCCH and the report corresponding to the triggered ACSI on the second PUCCH resource.

If the CSI latency timeline/requirement is not satisfied (e.g., second bullet ('condition 2' above) in the above embodiment); a second PUCCH resource is determined, since the HARQ-ACK PUCCH resource is not suitable for ACSI reporting. The second PUCCH resource can be indicated by RRC signaling in the associated CSI report configuration. In such a case there could be overlap between the two PUCCH resources depending on the PUCCH resource configurations. Alternatively, the UE is not expected to be indicated in DCI a first PUCCH resource overlapping with the second PUCCH resource in case the CSI latency requirement is not satisfied by the first PUCCH resource as mentioned in Embodiment 3a below.

In a related embodiment, if the first and the second PUCCH resources overlap in time for the same carrier, the UE transmits one of the first PUCCH or the second PUCCH e.g., via RRC configuration (the RRC configuration determines which PUCCH resource (HARQ ACK PUCCH or CSI PUCCH) to be prioritized).

In one example, the PUCCH resource indicator in the DCI may indicate a pair (first, second) of PUCCH resources (e.g., indicates an element of PUCCH resource list associated with two values of PUCCH resource ID). In another example, the first PUCCH resource is indicated by the PUCCH resource indicator value (index within the higher layer configured PUCCH resource list). The second PUCCH resource is determined as the next (e.g., PUCCH resource indicator value+1 modulo max number of PUCCH resources in PUCCH resource set) PUCCH resource in the PUCCH resource list configured by higher layers. In another example, the second PUCCH resource is determined as a configured/fixed number 'b' (e.g., PUCCH resource indicator value+'b' modulo max number of PUCCH resources in PUCCH resource set) PUCCH resource in the PUCCH resource list configured by higher layers.

Embodiment 3a: In an embodiment, when a DL grant triggers ACSI and schedules a PDSCH transmission, in case different PUCCH resources are used for HARQ-ACK transmission corresponding to the PDSCH and for the triggered ACSI transmission, the UE is not expected to receive/determine overlapping PUCCH resources in time corresponding to the HARQ-ACK and the triggered CSI. In an example, the indicated K1 value (PDSCH-to-HARQ_feedback timing indicator) and the determined/indicated KCSI value (e.g., a PDDCH/PDSCH-to-CSI feedback timing) are not expected to result in overlapping PUCCHs in time domain on the same carrier.

In an embodiment, when an UL grant/assignment triggers ACSI and schedules a PUSCH transmission, in case a PUCCH resource is determined to convey the ACSI and a PUSCH resource/transmission occasion is allocated for UL data transmission, the UE is not expected to be allocated overlapping PUCCH and PUSCH resources in time.

Alternatively, the ACSI would be transmitted on the PUSCH.

In an embodiment, when a DL grant triggers ACSI and schedules a PDSCH transmission (with multiple repetitions of the PDSCH e.g., scheduled by a single DL grant), the UE determines a first PUCCH resource and a second PUCCH resource, and transmits the HARQ-ACK transmission corresponding to the PDSCH on the first PUCCH resource and the CSI report corresponding to the triggered ACSI on the second PUCCH resource.

In an embodiment, the first and the second PUCCH resources are the same if the PDSCH has smaller than a threshold repetitions/number of symbols; otherwise, the first and the second PUCCH resources are different. for HARQ-ACK transmission on a PUCCH/PUSCH, the UE has to wait till end of all of the PDSCH repetitions (if all of the repetitions scheduled by a single DCI); whereas for CSI, the UE doesn't need to wait till end of PDSCH symbols/repetitions.

In an embodiment, the first PUCCH resource and the second PUCCH resource are on different serving cells/carriers.

Additional Embodiments

Embodiment a

In an embodiment, ACSI transmitted on PUCCH is restricted to use certain PUCCH formats (e.g., PUCCH format 0 or PUCCH format 2; e.g., depending on the PUCCH payload size). The PUCCH format to use can also be configured as part of the CSI report configuration or can be indicated by the DCI scheduling the PUCCH. Although for UCI multiplexing purpose (multiplexing multiple UCIs e.g., HARQ ACK/SR/CSI or multiplexing different UCIs of different component carriers/BWPs), it may be better to determine the PUCCH format to be used.

Other Embodiments

In an embodiment, ACSI triggered by a DL assignment has the same/similar priority as the HARQ ACK (PUCCH used for HARQ ACK).

In an embodiment, ACSI triggered by an UL grant/assignment has the same/similar priority as the scheduled (via the UL grant/assignment) PUSCH.

In an embodiment, ACSI triggered by a DL assignment has the same/similar priority as the aperiodic CSI reports to be carried on a PUSCH.

In an embodiment, ACSI triggered by DL/UL grant is transmitted on PUCCH of the supplementary carrier (normal/non-supplementary carrier and supplementary carrier are associated with a single downlink carrier).

In an embodiment, CSI report configurations associated with an A-CSI trigger state have the same priority (e.g., in terms of low-latency CSI vs. non-low-latency CSI). In another embodiment, low-latency CSI can be triggered by certain DCI formats/DL DCI. In another embodiment, a priority index is configured for each CSI report configuration.

In an embodiment, ACSI can be triggered via DL DCI with a DCI format if the DCI is received in a predetermined subset of search spaces/CORESETs.

In an embodiment, ACSI can be triggered via DL/UL DCI with a DCI format with a determined/indicated PUCCH resource if the DCI is received in a predetermined subset of search spaces/CORESETs. For instance, if DCI format 1-2 is received in search space/CORESET A, there is a field in the DCI to indicate the PUCCH resource for ACSI transmission, and if DCI format 1-2 is received in search space/CORESET B, ACSI cannot be triggered by DCI format 1-2. In another example, if DCI format 0-2 is received in search space/CORESET A, there is a field in the DCI to indicate the PUCCH resource for ACSI transmission, and if DCI format 0-2 is received in search space/CORESET B (and scheduling a PUSCH), the triggered ACSI is transmitted on the scheduled PUSCH.

In an embodiment, the UE is not expected to be triggered with an ACSI report with an associated PUCCH for the ACSI report transmission more than once in a period of time (e.g., within a slot or a number slots configured by RRC or based on a capability signaling).

The embodiment can be useful to minimize processing/collision cases (e.g., collision between PUCCH and PUSCH) as simultaneous PUSCH and PUCCH are not supported, and there are DMRS symbols for a PUCCH.

In an embodiment, the UE indicates in a PUCCH resource associated with the triggered ACSI report, whether the ACSI report is included in the PUCCH or not. One motivation of this embodiment is that the gNB by triggering the ACSI report wants to check if a significant update to scheduling is needed, and if so what would be a good MCS/CQI. Sometimes the most recently used MCS is fine to use, especially given transmission of a transport block with small size and with low BLER target for URLLC operation.

In an embodiment, a triggered CSI state comprises at most 'M' CSI report configurations, and 'M' is a UE capability (higher layer signal) for low latency/high priority operation (wherein high priority CSI report is in comparison to a CSI report with low priority; wherein the priority (high vs. low) can be used to decide which CSI report to be dropped in case of collision of different CSI reports associated with different priorities (high vs. low, and the CSI report associated with low priority can be dropped)). In an example, the priority (high vs. low or e.g., priority index '1' vs. priority index '0') is configured as part of the CSI report configuration.

In one example, collision between two CSI reports is defined as collision between transmissions of those two CSI reports.

In another example, collision between two CSI reports is defined in the case that the low priority CSI report(s) is already using/occupying one or more of the CSI processing units (CPU) (e.g., as defined in section 5.2.1.6 of TS 38.214), and the high priority CSI report is triggered. In such a case, in one example, one or more of low priority CSI reports occupying CPUs are dropped to allow processing of CSI report with the high priority.

In a related example, the latest low priority CSI reports which started occupying CPUs are dropped to make room for processing of the triggered high priority CSI report.

In a related example, a part of CSI report for one or more of low priority CSI reports is omitted to allow CPUs for processing a triggered high priority CSI report.

In another example, the priority for a CSI report is derived at least based on an RRC parameter of the CSI report configuration (e.g., a priority index configured for the CSI report configuration) and priority rules similar to those defined in section 5.2.5 of TS 38.214. In one example, CSI reports with high priority indication (RRC parameter of the CSI report configuration (e.g., a priority index configured for the CSI report configuration)) have higher priority compared to those CSI reports with low priority indication (RRC parameter of the CSI report configuration (e.g., a priority index configured for the CSI report configuration)) or those CSI reports without priority indication (no priority index configured for the CSI report configuration); and within high priority CSI reports, priority rules similar to those defined in section 5.2.5 of TS 38.214 are applicable; and within low priority CSI reports, priority rules similar to those defined in section 5.2.5 of TS 38.214 are applicable.

In one example, instead of ACSI in the embodiments described, semipersistent CSI can be used (e.g., triggered by DL DCI).

In accordance with at least some of the embodiments, one or more of the following can be supported:

1. Determining Transmission power of a first and a second PUCCH transmissions corresponding to HARQ ACK of scheduled PDSCH, and triggered ACSI by a DL grant;
2. Determining PUCCH resource when an UL grant is used for ACSI transmission;
3. Determining PUSCH resource/occasion when an UL grant is used for ACSI transmission, and multiple PUSCH resources/occasions are scheduled by the UL grant;
4. Determining PUCCH format to carry ACSI.

Figure 9:
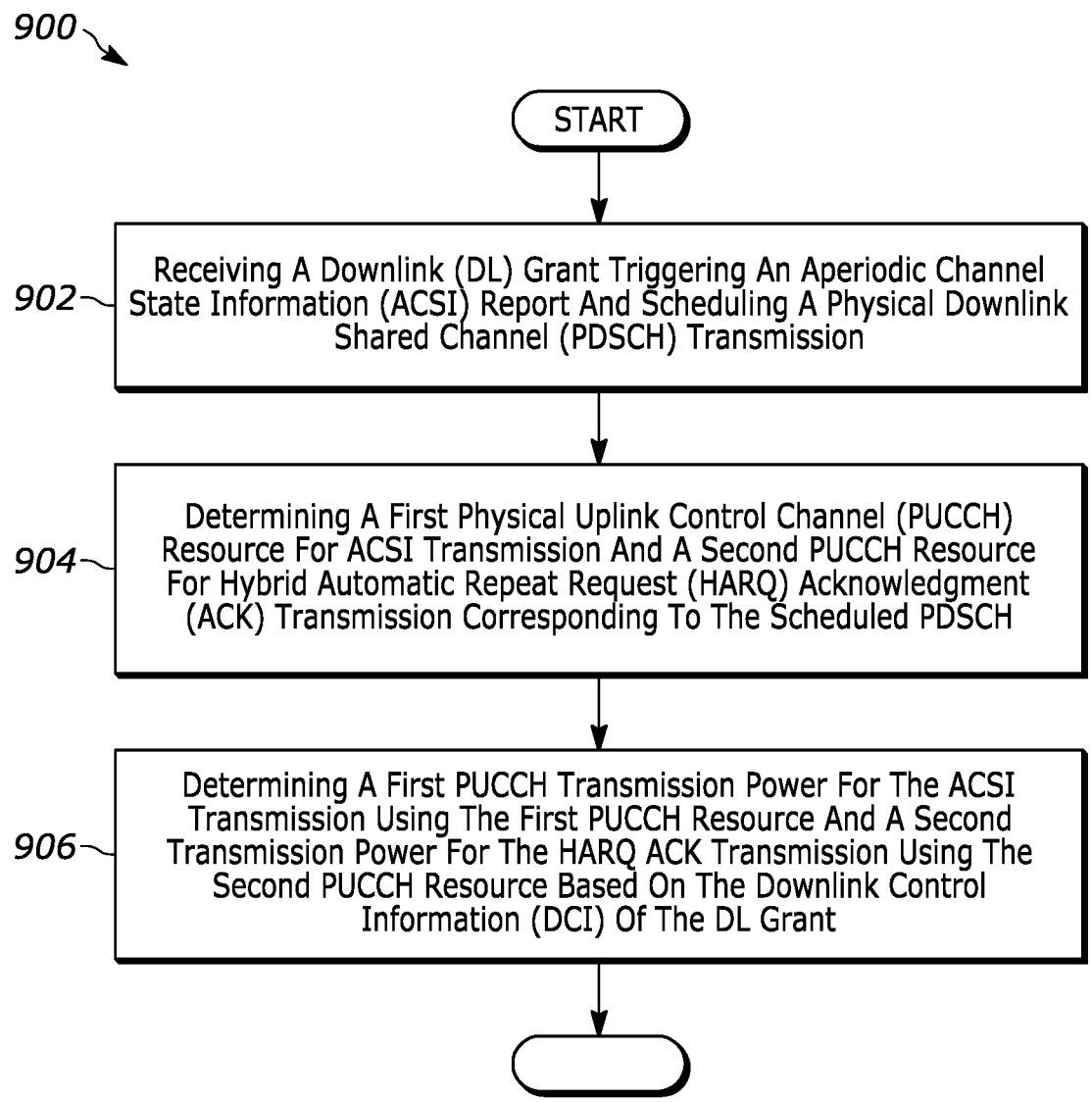
FIG. 9 is a flow diagram in a user equipment for triggering and scheduling the transmission of an ACSI report.

FIG. 9 illustrates a flow diagram 900 in a user equipment for triggering and scheduling the transmission of an ACSI report. In accordance with at least one embodiment, the method can include receiving 902 a downlink (DL) grant triggering an aperiodic channel state information (ACSI) report and scheduling a physical downlink shared channel (PDSCH) transmission. A first physical uplink control channel (PUCCH) resource for ACSI transmission and a second PUCCH resource for hybrid automatic repeat request (HARQ) acknowledgment (ACK) transmission corresponding to the scheduled PDSCH can be determined 904. A first PUCCH transmission power for the ACSI transmission using the first PUCCH resource and a second transmission power for the HARQ ACK transmission using the second PUCCH resource can be determined 906 based on downlink control information (DCI) of the DL grant.

In some instances, the first PUCCH resource can end earlier than the second PUCCH resource.

In some instances, the first PUCCH resource can be transmitted on a carrier that is different than a carrier on which the second PUCCH resource is transmitted.

In some instances, the ACSI transmission using the first PUCCH resource and the HARQ ACK transmission using the second PUCCH resource may not overlap in time. In some of these instances, the ACSI transmission using the first PUCCH resource can be scheduled on a supplementary carrier and HARQ ACK transmission using the second PUCCH resource can be scheduled on a non-supplementary carrier of a serving cell.

In some instances, the ACSI report and corresponding determination of the first PUCCH resource for ACSI transmission can be triggered in absence of an uplink grant.

In some instances, the DCI can include at least a transmit power command (TPC). In some of these instances, the same TPC of the DCI can be applied for use with both the first and second PUCCH resources. In other instances, one of the first PUCCH transmission power and the second PUCCH transmission power can be derived based on the TPC, and wherein the other one of the first PUCCH transmission power and the second PUCCH transmission power can be derived based on an adjusted TPC, where the adjusted TPC can include a value in which at least one parameter of the TPC has had a predetermined offset applied. In some of these instances, the at least one parameter can include a Po_PUCCH parameter, where the predetermined offset can be applied to the value of the parameter in deriving the first PUCCH transmission power.

In some instances, the first PUCCH resource can be selected to be the second PUCCH resource, when a first symbol of the second PUCCH resource is at least a predetermined amount of time after a last symbol of the PDSCH, and a last symbol of the second PUCCH is before an expiration of a predetermined latency requirement for the ACSI report.

In some instances, a start of the first PUCCH resource can occur before the end of the PDSCH transmission.

In some instances, the PDSCH can include multiple PDSCH repetitions, and a start of the first PUCCH resource can occur before the end of a last one of the multiple PDSCH repetitions.

Figure 10:
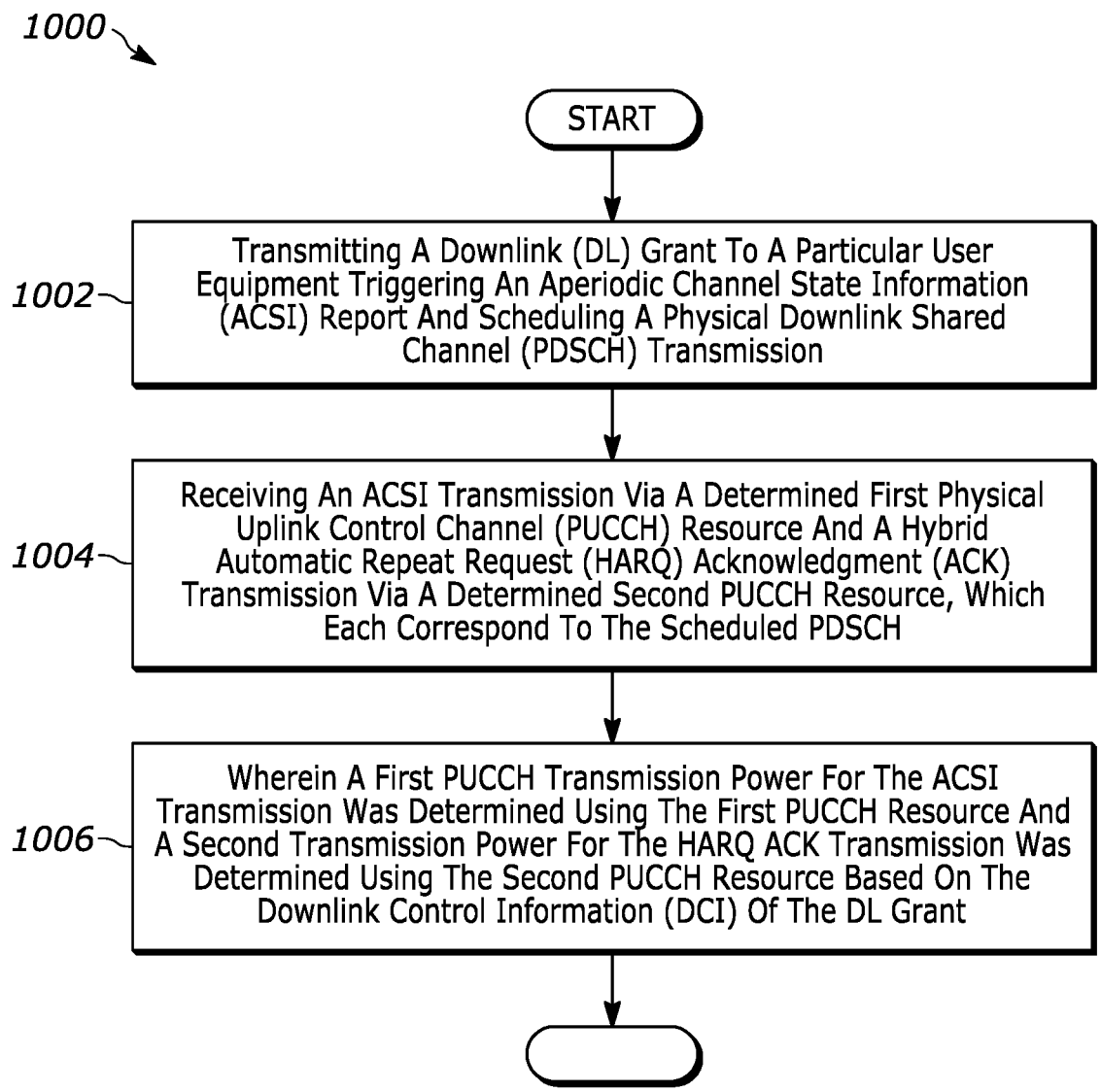
FIG. 10 is a flow diagram in a network entity for triggering and scheduling the reception of an ACSI report.

FIG. 10 illustrates a flow diagram 1000 in a network entity for triggering and scheduling the reception of an ACSI report. In accordance with at least one embodiment, the method can include transmitting 1002 a downlink (DL) grant to a particular user equipment triggering an aperiodic channel state information (ACSI) report and scheduling a physical downlink shared channel (PDSCH) transmission. An ACSI transmission via a determined first physical uplink control channel (PUCCH) resource and a hybrid automatic repeat request (HARQ) acknowledgment (ACK) transmission via a determined second PUCCH resource, which each correspond to the scheduled PDSCH can then be received 1004, where a first PUCCH transmission power for the ACSI transmission can be determined using the first PUCCH resource and a second transmission power for the HARQ ACK transmission can be determined using the second PUCCH resource based on downlink control information (DCI) of the DL grant 1006.

A Further embodiment can include a method in the user equipment (UE), where the method can include receiving an uplink (UL) grant triggering an aperiodic channel state information (ACSI) report and scheduling a physical uplink shared channel (PUSCH) transmission. The UL grant can indicate at least one of a) whether to transmit the ACSI report on the PUSCH or on a physical uplink control channel (PUCCH), and b) a particular PUCCH resource upon which the ACSI report is to be sent when the ACSI report is to be sent on the PUCCH.

A still further embodiment can include a method in the user equipment, where the method can include receiving an uplink (UL) grant triggering an aperiodic channel state information (ACSI) report and scheduling at least two physical uplink shared channel (PUSCH) transmissions. Downlink control information (DCI) can indicate on which one of the at least two PUSCH transmissions, the ACSI report should be carried.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 11:
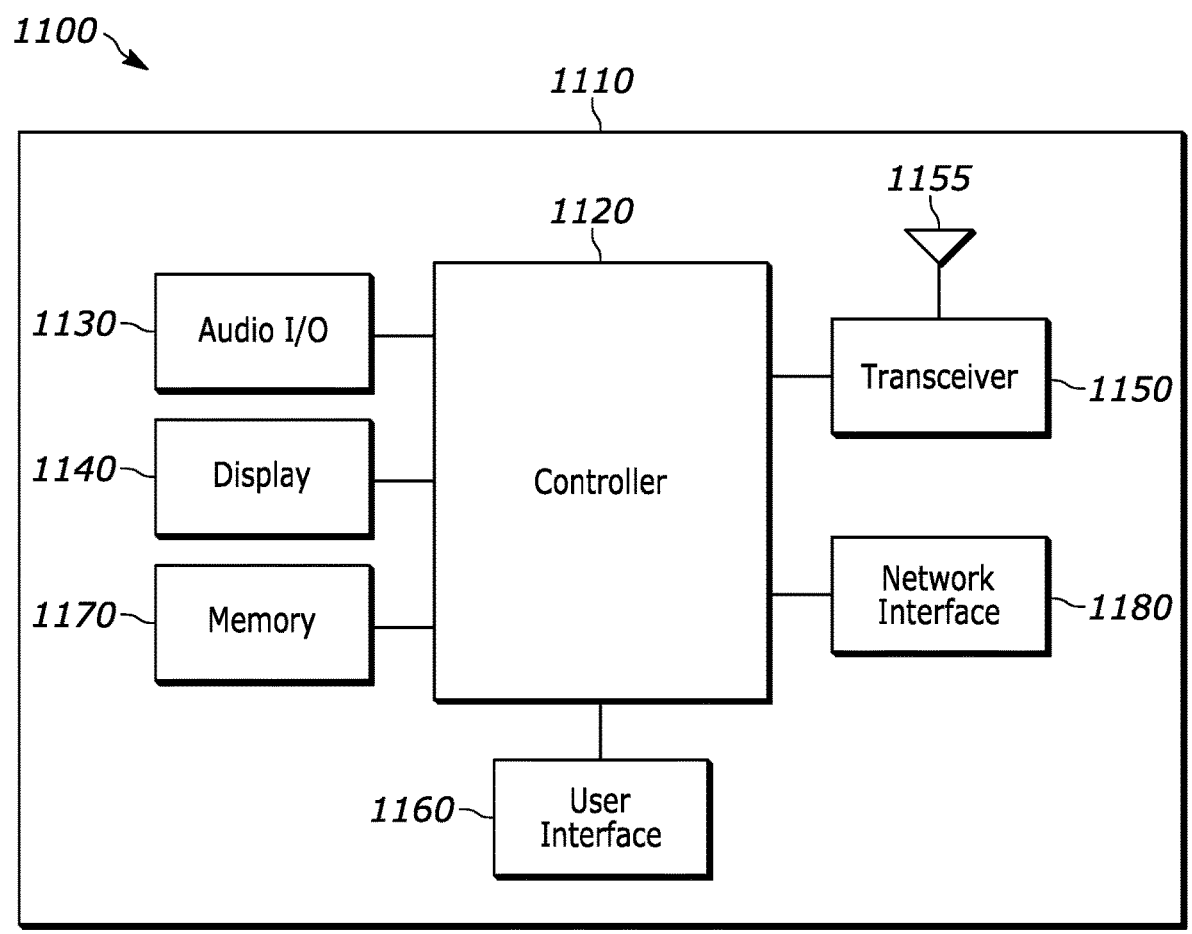
FIG. 11 is an exemplary block diagram of an apparatus according to a possible embodiment.

FIG. 11 is an example block diagram of an apparatus 1100, such as the wireless communication device 110, according to a possible embodiment. The apparatus 1100 can include a housing 1110, a controller 1120 within the housing 1110, audio input and output circuitry 1130 coupled to the controller 1120, a display 1140 coupled to the controller 1120, a transceiver 1150 coupled to the controller 1120, an antenna 1155 coupled to the transceiver 1150, a user interface 1160 coupled to the controller 1120, a memory 1170 coupled to the controller 1120, and a network interface 1180 coupled to the controller 1120. The apparatus 1100 can perform the methods described in all the embodiments The display 1140 can be a viewfinder, a liquid crystal display (LCD), a light emitting diode (LED) display, a plasma display, a projection display, a touch screen, or any other device that displays information. The transceiver 1150 can include a transmitter and/or a receiver. The audio input and output circuitry 1130 can include a microphone, a speaker, a transducer, or any other audio input and output circuitry. The user interface 1160 can include a keypad, a keyboard, buttons, a touch pad, a joystick, a touch screen display, another additional display, or any other device useful for providing an interface between a user and an electronic device. The network interface 1180 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 1170 can include a random access memory, a read only memory, an optical memory, a solid state memory, a flash memory, a removable memory, a hard drive, a cache, or any other memory that can be coupled to an apparatus.

The apparatus 1100 or the controller 1120 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a. NET® framework, or any other application framework. The software and/or the operating system may be stored in the memory 1170 or elsewhere on the apparatus 1100. The apparatus 1100 or the controller 1120 may also use hardware to implement disclosed operations. For example, the controller 1120 may be any programmable processor. Disclosed embodiments may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 1120 may be any controller or processor device or devices capable of operating an apparatus and implementing the disclosed embodiments. Some or all of the additional elements of the apparatus 1100 can also perform some or all of the operations of the disclosed embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

What is claimed is:

1. A method performed by a user equipment (UE), the method comprising:
   receiving a downlink (DL) grant triggering an aperiodic channel state information (ACSI) report and scheduling a physical downlink shared channel (PDSCH) transmission, wherein the PDSCH transmission includes multiple PDSCH repetitions;
   determining a first physical uplink control channel (PUCCH) resource for an ACSI transmission and a second PUCCH resource for a hybrid automatic repeat request (HARQ) acknowledgment (ACK) transmission corresponding to the PDSCH transmission, wherein a start of the first PUCCH resource occurs before an end of a last PDSCH repetition of the multiple PDSCH repetitions; and
   determining a first PUCCH transmission power for the ACSI transmission using the first PUCCH resource and a second transmission power for the HARQ ACK transmission using the second PUCCH resource based at least in part on downlink control information (DCI) of the DL grant.

2. The method of claim 1, wherein the first PUCCH resource ends earlier than the second PUCCH resource.

3. The method of claim 1, wherein the first PUCCH resource is transmitted on a first carrier that is different from a second carrier on which the second PUCCH resource is transmitted.

4. The method of claim 1, wherein the ACSI transmission using the first PUCCH resource and the HARQ ACK transmission using the second PUCCH resource do not overlap in time.

5. The method of claim 4, wherein the ACSI transmission using the first PUCCH resource is scheduled on a supplementary carrier and HARQ ACK transmission using the second PUCCH resource is scheduled on a non-supplementary carrier of a serving cell.

6. The method of claim 1, wherein the ACSI report and corresponding determination of the first PUCCH resource for the ACSI transmission is triggered in absence of an uplink grant.

7. The method of claim 1, wherein the DCI includes at least a transmit power command (TPC).

8. The method of claim 7, wherein a same TPC of the DCI is applied for use with both the first and second PUCCH resources.

9. The method of claim 7, further comprising:
   deriving one of the first PUCCH transmission power or the second PUCCH transmission power based at least in part on the TPC; and
   deriving the other one of the first PUCCH transmission power or the second PUCCH transmission power is derived based at least in part on an adjusted TPC, wherein the adjusted TPC includes a value in which at least one parameter of the TPC has had a predetermined offset applied.

10. The method of claim 9, wherein the at least one parameter includes a Po_PUCCH parameter, and wherein the predetermined offset is applied to the value of the parameter in deriving the first PUCCH transmission power.

11. The method of claim 1, further comprising selecting the first PUCCH resource to be the second PUCCH resource based at least in part on a first symbol of the second PUCCH resource being at least a predetermined amount of time after a last symbol of the PDSCH transmission and a last symbol of the second PUCCH being before an expiration of a predetermined latency requirement for the ACSI report.

12. The method of claim 1, wherein a start of the first PUCCH resource occurs before an end of the PDSCH transmission.

13. A user equipment (UE) for wireless communication, comprising:
   at least one memory; and
   at least one processor coupled with the at least one memory and operable to cause the UE to:
      receive a downlink (DL) grant triggering an aperiodic channel state information (ACSI) report and scheduling a physical downlink shared channel (PDSCH) transmission, wherein the PDSCH transmission includes multiple PDSCH repetitions;
      determine a first physical uplink control channel (PUCCH) resource for an ACSI transmission and a second PUCCH resource for a hybrid automatic repeat request (HARQ) acknowledgment (ACK) transmission corresponding to the PDSCH transmission, wherein a start of the first PUCCH resource occurs before an end of a last PDSCH repetition of the multiple PDSCH repetitions; and
      determine a first PUCCH transmission power for the ACSI transmission using the first PUCCH resource and a second transmission power for the HARQ ACK transmission using the second PUCCH resource based at least in part on downlink control information (DCI) of the DL grant.

14. The UE of claim 13, wherein the first PUCCH resource ends earlier than the second PUCCH resource.

15. The UE of claim 13, wherein the at least one processor is further operable to cause the UE to transmit the first PUCCH resource on a carrier that is different from a carrier on which the second PUCCH resource is transmitted.

16. The UE of claim 13, wherein the ACSI transmission using the first PUCCH resource and the HARQ ACK transmission using the second PUCCH resource do not overlap in time.

17. The UE of claim 13, wherein the DCI includes at least a transmit power command (TPC).

18. The UE of claim 13, further comprising selecting the first PUCCH resource to be the second PUCCH resource based at least in part on a first symbol of the second PUCCH resource being at least a predetermined amount of time after a last symbol of the PDSCH transmission and a last symbol of the second PUCCH being before an expiration of a predetermined latency requirement for the ACSI report.

19. A method performed by a network equipment (NE), the method comprising:
　　transmitting a downlink (DL) grant triggering an aperiodic channel state information (ACSI) report and scheduling a physical downlink shared channel (PDSCH) transmission, wherein the PDSCH transmission includes multiple PDSCH repetitions; and
　　receiving an ACSI transmission based at least in part on a first physical uplink control channel (PUCCH) resource and a hybrid automatic repeat request (HARQ) acknowledgment (ACK) transmission corresponding to the PDSCH transmission based at least in part on a second PUCCH resource, wherein a start of the first PUCCH resource occurs before an end of a last PDSCH repetition of the multiple PDSCH repetitions, and wherein a first PUCCH transmission power for the ACSI transmission using the first PUCCH resource and a second transmission power for the HARQ ACK transmission using the second PUCCH resource are based at least in part on downlink control information (DCI) of the DL grant.

20. A network equipment (NE) for wireless communication, comprising:
　　at least one memory; and
　　at least one processor coupled with the at least one memory and operable to cause the NE to:
　　　　transmit a downlink (DL) grant triggering an aperiodic channel state information (ACSI) report and scheduling a physical downlink shared channel (PDSCH) transmission, wherein the PDSCH transmission includes multiple PDSCH repetitions; and
　　　　receive an ACSI transmission based at least in part on a first physical uplink control channel (PUCCH) resource and a hybrid automatic repeat request (HARQ) acknowledgment (ACK) transmission corresponding to the PDSCH transmission based at least in part on a second PUCCH resource, wherein a start of the first PUCCH resource occurs before an end of a last PDSCH repetition of the multiple PDSCH repetitions, and wherein a first PUCCH transmission power for the ACSI transmission using the first PUCCH resource and a second transmission power for the HARQ ACK transmission using the second PUCCH resource are based at least in part on downlink control information (DCI) of the DL grant.

\* \* \* \* \*